United States Patent
Chang et al.

(10) Patent No.: US 8,783,723 B2
(45) Date of Patent: Jul. 22, 2014

(54) SAFETY BELT SYSTEM AND BELT WINDER

(71) Applicant: Johnson Electric S.A., Murten (CH)

(72) Inventors: Hang Fung Chang, Hong Kong (CN); Hang Cheong Ma, Hong Kong (CN); Daniel Ming Hong Wong, Hong Kong (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 13/745,538

(22) Filed: Jan. 18, 2013

(65) Prior Publication Data

US 2013/0187434 A1    Jul. 25, 2013

(30) Foreign Application Priority Data

Jan. 20, 2012  (CN) .......................... 2012 1 0019153

(51) Int. Cl.
  *B60R 22/36*  (2006.01)
(52) U.S. Cl.
  USPC ............................................. 280/806
(58) Field of Classification Search
  USPC .......... 280/806, 807; 310/225, 231, 233, 234, 310/12.13, 12.14, 12.24, 13, 14, 309, 310/323.02; 297/475, 476, 477, 479; 242/390.08
  See application file for complete search history.

(56) References Cited

U.S. PATENT DOCUMENTS

| | | | |
|---|---|---|---|
| 519,098 A | 5/1894 | Schmid et al. | |
| 525,447 A | 9/1894 | Dahl | |
| 4,280,072 A | 7/1981 | Gotou et al. | |
| 4,672,253 A | 6/1987 | Tajima et al. | |
| 4,900,963 A | 2/1990 | Amano et al. | |
| 5,172,870 A | 12/1992 | Van Assema | |
| 5,348,123 A | 9/1994 | Takahashi et al. | |
| 5,661,355 A | 8/1997 | Darceot | |
| 8,350,420 B2 * | 1/2013 | Kimura et al. | ............. 310/12.13 |
| 2005/0184612 A1 | 8/2005 | Cros et al. | |
| 2006/0113420 A1* | 6/2006 | Nomura | ......................... 242/374 |
| 2008/0314700 A1 | 12/2008 | Cho | |
| 2011/0050025 A1 | 3/2011 | Doushita et al. | |
| 2011/0062697 A1 | 3/2011 | Kimura et al. | |
| 2011/0147144 A1 | 6/2011 | Ma et al. | |

FOREIGN PATENT DOCUMENTS

| | | |
|---|---|---|
| CN | 200942768 Y | 9/2007 |
| EP | 2 246 225 | 11/2010 |
| EP | 2 246 225 A1 | 11/2010 |

* cited by examiner

*Primary Examiner* — Faye M. Fleming
(74) *Attorney, Agent, or Firm* — Muncy, Geissler, Olds & Lowe, P.C.

(57) ABSTRACT

A belt winder for a safety belt system includes a belt reel for tightening or loosing the safety belt, and an electric motor for driving the belt reel. The motor includes a stator and a rotor rotatably mounted to the stator. The rotor includes an motor shaft, a commutator fixed to the motor shaft, a rotor core fixed to the motor shaft and rotor windings wound about teeth of the rotor core and electrically connected to segments of the commutator. The rotor windings include a plurality of winding units. Each winding unit includes at least two coils, the coils of each winding unit being wound about the same teeth and electrically connected to a same pair of segments in parallel. A safety belt system incorporating the belt winder is also provided.

18 Claims, 5 Drawing Sheets

SAFETY BELT SYSTEM AND BELT WINDER

CROSS REFERENCE TO RELATED APPLICATIONS

This non-provisional patent application claims priority under 35 U.S.C. §119(a) from Patent Application No. 201210019153.1 filed in The People's Republic of China on Jan. 20, 2012, the entire contents of which are fully incorporated herein by reference.

FIELD OF THE INVENTION

This invention relates to a safety belt system and in particular, to an electric motor used in a belt winder of the safety belt system.

BACKGROUND OF THE INVENTION

Safety belt systems were developed to secure the occupant of a vehicle against harmful movement that may result during a collision or a sudden stop. The systems reduce the likelihood and severity of injury in a traffic collision by stopping the vehicle occupant from hitting hard against interior elements of the vehicle or other passengers (the so-called second impact), by keeping occupants positioned correctly for maximum benefit from the airbag and by preventing occupants being ejected from the seat of the vehicle.

A traditional safety belt system comprises a safety belt for restraining the occupant in the seat, a belt winder for tightening or loosing the safety belt, and an electric motor for driving the belt winder. FIG. 6 illustrates a winding scheme of a traditional permanent magnet direct current (PMDC) motor used for driving the belt winder in a safety belt system. The rotor windings comprise a plurality of coils wound about teeth of the rotor core and electrically connected to segments of a commutator. For example, coil C1' is wound about teeth T1 and T2 and connected to segments S1 and S2. Coil C2' is wound about teeth T2 and T3 and connected to segments S2 and S3. The PMDC motor comprises two brushes to feed electricity to the rotor windings. The rotor windings form two parallel branches. When a coil such as coil C1' is open, one of the branches will be open. The motor as well as the safety belt system will malfunction. It is dangerous to drive a car having a malfunctioning safety belt system.

Therefore, there is a desire for a safety belt system with improved reliability.

SUMMARY OF THE INVENTION

Accordingly, in one aspect thereof, the present invention provides a safety belt system, comprising a safety belt for restraining an occupant in a seat; a tongue plate arranged on the safety belt; a buckle detachably engaged with the tongue plate; a belt reel for tightening or loosing the safety belt; an electric motor for driving the belt reel; a detection unit for detecting whether a predefined event happens or will immediately happen; and a controller for controlling the motor based on the detecting result of the detection unit. The motor comprises a stator and a rotor rotatably mounted to the stator, the rotor comprising an motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments in parallel.

According to a second aspect, the present invention also provides a belt winder for a safety belt system comprising: a belt reel for tightening or loosing the safety belt; and an electric motor for driving the belt reel, the motor comprising a stator and a rotor rotatably mounted to the stator, the rotor comprising an motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments in parallel.

Preferably, each winding unit comprises two coils, one of the two coils being arranged in an inner layer, the other one of the two coils being arranged in an outer layer.

Preferably, the rotor windings are wound by one continuous wire.

Optionally, a part of the inner layer coils and a part of the outer layer coils are wound by one continuous wire, and the other part of the inner layer coils and the other part of the outer layer coils are wound by another continuous wire.

Optionally, at least one dummy slot is formed in a circumferential surface of each tooth of the rotor core.

Preferably, the rotor core comprises five teeth, and each tooth comprises two dummy slots formed in a circumferential surface of the tooth.

Optionally, the belt winder further comprises a transmission unit coupled between the motor shaft and a central shaft of the belt reel, the motor driving the belt reel via the transmission unit.

Optionally, the belt winder further comprises a pretensioner coupled to a central shaft of the belt reel.

Preferably, the belt winder further comprises a pretensioner coupled to one end of a central shaft of the belt reel, and a transmission unit coupled between the motor shaft and the other end of the central shaft.

Preferably, the number of the teeth is the same as the number of the segments.

Preferably, the stator has two magnetic poles, the rotor core has five teeth, and the commutator has five segments.

In the embodiments of the present invention, both of the coils of each winding unit of rotor windings are wound about the same teeth and are electrically connected to the same segments in parallel. If one of the coils of a winding unit is open circuited, current is still conducted by the winding unit via the other coil. Testing results show that the motor still works, with only a slight loss of performance. Therefore, a safety belt system using the motor is more reliable and safer than the traditional safety belt system.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
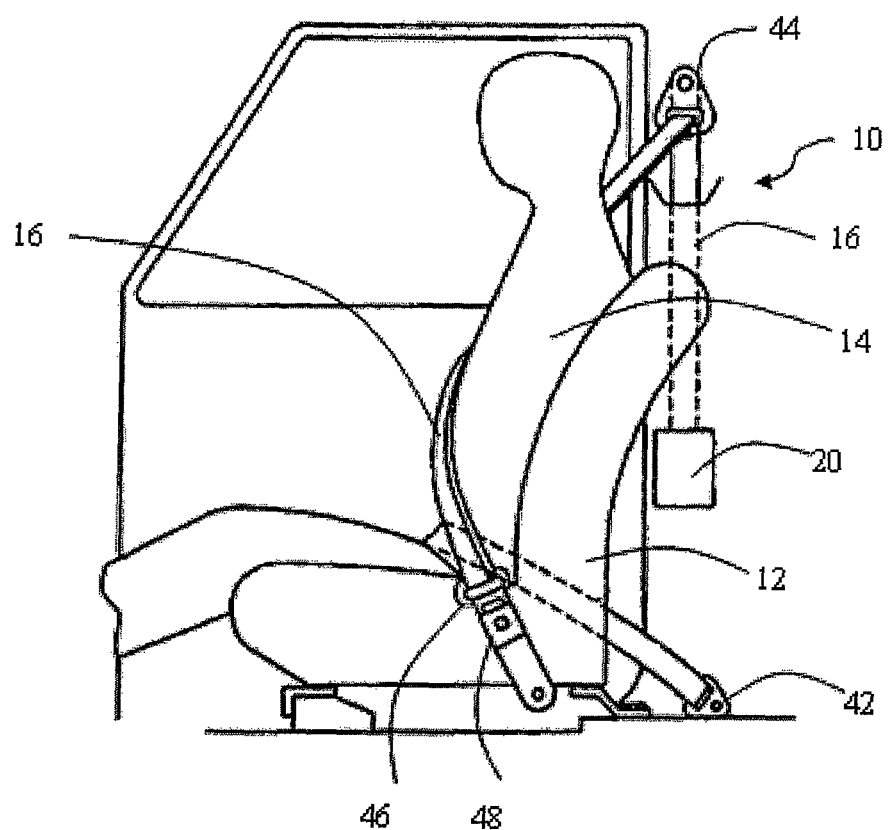
FIG. 1 illustrates a safety belt system according to a preferred embodiment of the present invention.

Referring to FIG. 1, a safety belt system 10 for a seat 12 of a vehicle according to a preferred embodiment of the present invention comprises a safety belt 16 for restraining an occupant 14 in an emergency. A first end of the safety belt 16 is coupled to a belt winder 20. The second end of the safety belt 16 is coupled to a fastener 42 which is fixed at a lower portion of a body of the vehicle at one side of the seat 12. The safety belt 16 passes through a guide anchor 44 which is fixed at a higher portion of the body at the same side of the seat 12 as the fastener 42. A tongue plate 46 is slidably arranged on the safety belt 16 and detachably engagable with a buckle 48 at the other side of the seat 12.

Figure 2:
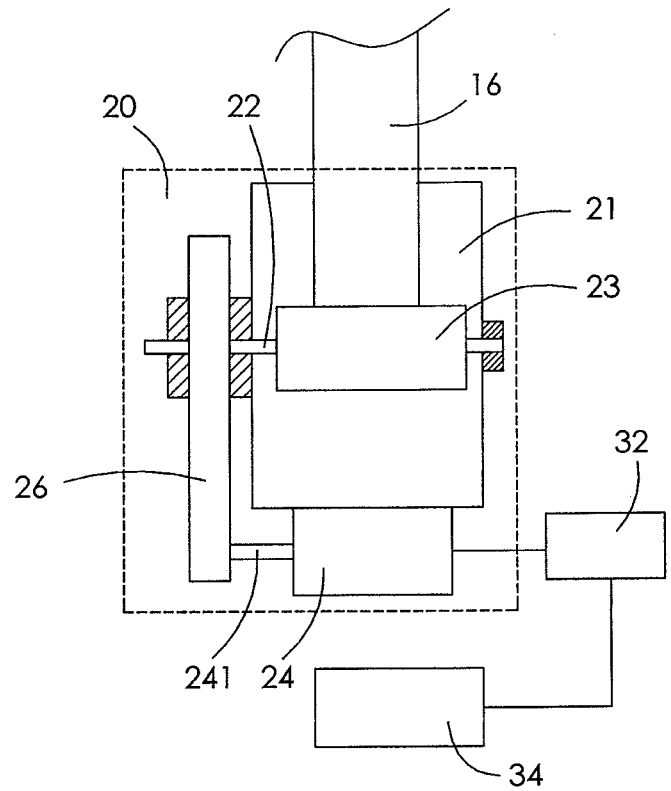
FIG. 2 illustrates a belt winder being a part of the safety belt system of FIG. 1.

Referring to FIG. 2, the belt winder 20 comprises a belt reel 23 with the first end of the safety belt 12 fixed thereon. The belt reel 23 has a central shaft 22 rotatably mounted to a bracket 21 which is fixed to the body of the vehicle. The belt reel 23 is able to be rotated by an electric motor 24. The motor shaft 241 of the motor 24 drives the central shaft 22 via a transmission unit in the form of a gear train 26. The motor 24 is capable of rotating bi-directionally such that the belt reel 23 can tighten and loosen the safety belt 16. The motor 24 is controlled by a controller 32. In this embodiment, the controller 32 controls the motor 24 to drive the belt reel 23 to tighten the safety belt 16 such that the safety belt 16 properly restrains the occupant 14 when a detection unit 34 detects a predefined event, such as a vehicle collision, is happening or is imminent.

The motor 24 is preferably a PMDC motor which comprises a stator and a rotor rotatably mounted to the stator. The rotor comprises the motor shaft 241, a commutator fixed to the motor shaft, a rotor core 242 fixed to the motor shaft and rotor windings 244 wound about teeth of the rotor core and electrically connected to segments of the commutator. The stator comprises at least one permanent magnet and at least two brushes in sliding contact with the commutator to feed electricity to the rotor windings via the commutator. In a preferred example, the stator has two permanent magnetic poles.

Figure 3A:
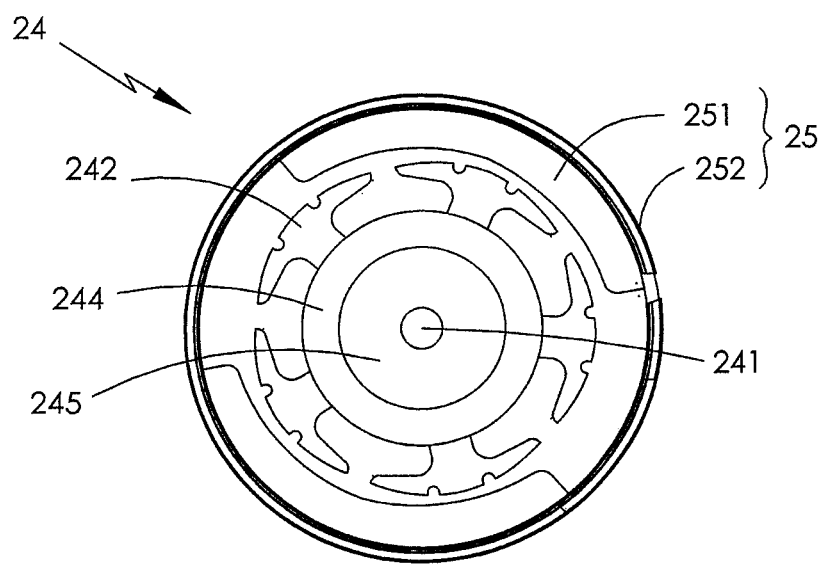
FIG. 3a is a cross sectional view of the motor of FIG. 3.
Figure 3:
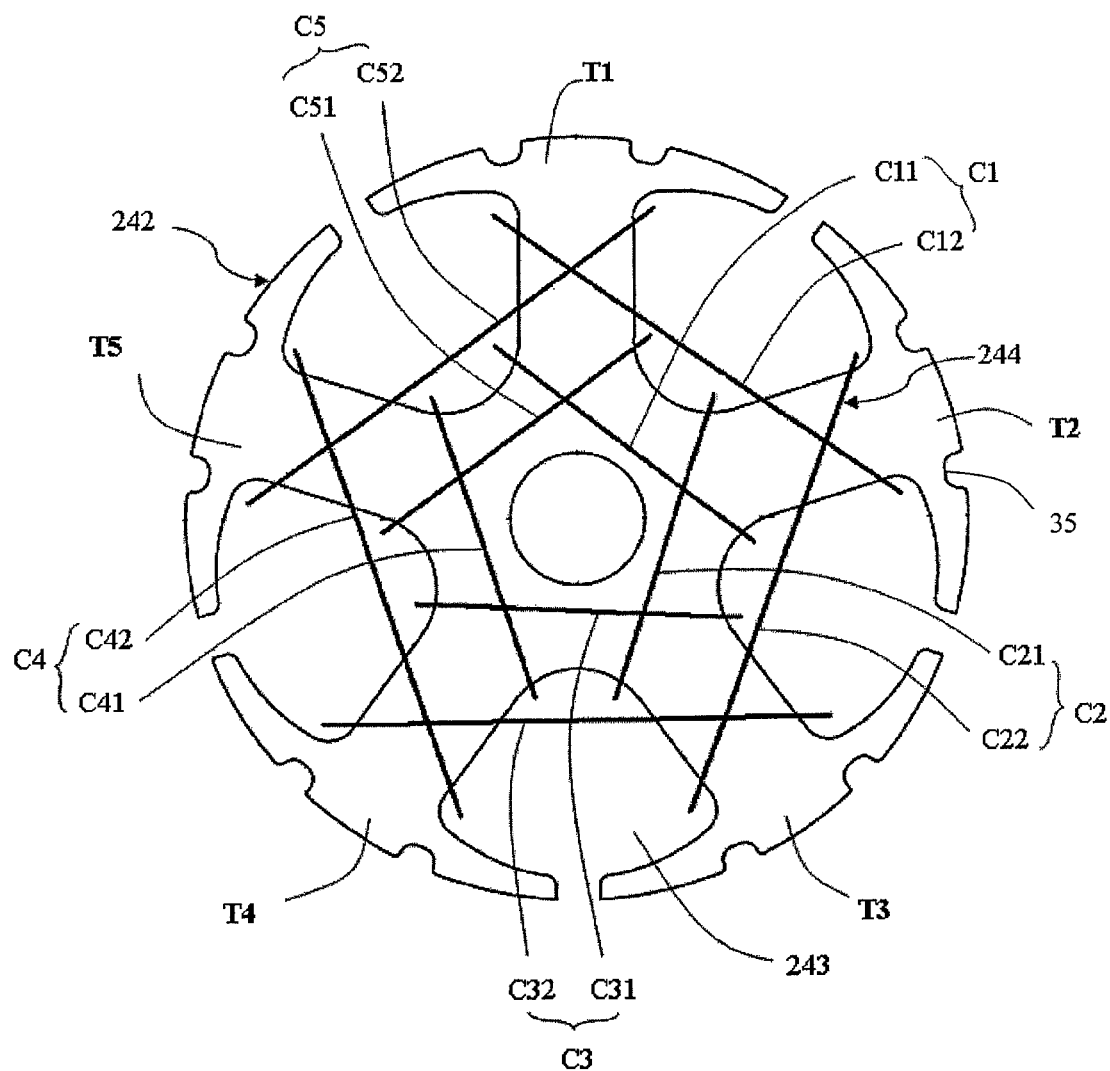
FIG. 3 illustrates a rotor core and rotor windings of a motor used in the belt winder of FIG. 2.

FIG. 3 illustrates the rotor core 242 and the rotor windings 244. The rotor core 242 comprises five teeth T1-T5. Winding slots 243 are formed by adjacent teeth and receive the rotor windings. The rotor windings 244 comprise ten coils Cn1 and Cn2, n=1, . . . , 5. The ten coils form five winding units Cn, n=1, . . . , 5, each of which comprises two coils. A first winding unit C1 comprises the coils C11 and C12. A second winding unit C2 comprises the coils C21 and C22. A third winding unit C3 comprises the coils C31 and C32. A fourth winding unit C4 comprises the coils C41 and C42, and a fifth winding unit C5 comprises the coils C51 and C52. Each of the coils of a winding unit is wound about the same teeth and electrically connected to the same pair of commutator segments, in parallel.

FIG. 3a is a cross section of the motor 24. The motor has a stator 25 having two magnetic poles formed by two arcuate permanent magnets 251 fitted to an inner surface of a motor housing 252. The commutator 245 is also shown, fitted to the motor shaft 241.

Figure 4:
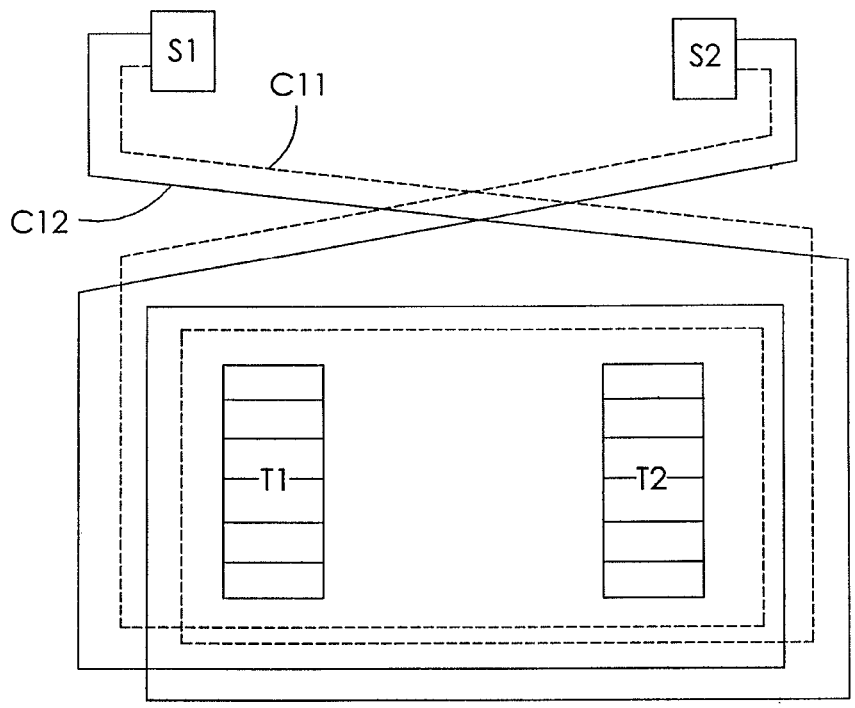
FIG. 4 illustrates a winding unit of the rotor windings of FIG. 3.

FIG. 4 illustrates the first winding unit comprising coils C11 and C12. Both of the coils C11 and C12 are wound about teeth T1 and T2 and are connected to segments S1 and S2. Therefore, the coils C11 and C12 are electrically connected in parallel. If one of the coils C11 and C12 is open circuited, current still flows through the first winding unit via the other coil. Testing results are illustrated in Table 1.

TABLE 1

Testing Result of Motor Performance

| | | Rotation Direction | | | |
| --- | --- | --- | --- | --- | --- |
| | | CW | | CCW | |
| | | Motor Performance | | | |
| | | Speed (RPM) | Current (A) | Speed (RPM) | Current (A) |
| Free load | Open Circuit | 15,800 | 1.54 | 15,483 | 1.51 |
| | Full Function Circuit | 16,636 | 0.855 | 16,298 | 0.846 |
| On Load (150 mNm) | Open Circuit | 9,588 | 19.77 | 10,084 | 20.34 |
| | Full Function Circuit | 9,936 | 19.91 | 10,439 | 20.66 |

In Table 1, the term "Open Circuit" means that one coil is open circuited while the other coil is conductive, while the term "Full Function Circuit" means that both of the coils are conductive, i.e., not open circuited. As shown in Table 1, in the case of open circuit, the motor still works, with only a slight performance loss. Therefore, a safety belt system using the motor is more reliable and safer compared to traditional safety belt system. A coil is said to be open circuited or open when the wire forming the coil is broken such that current can not flow through the coil from one segment to the next.

In this embodiment, the rotor windings comprise inner layer windings and outer layer windings. The coils Cn1, n=1, . . . , 5, are arranged in the inner layer, while the coils Cn2, n=1, . . . , 5, are arranged in the outer layer. That is, for each winding unit, one of the two coils is disposed in the inner layer, and the other one of the two coils is disposed in the outer layer. During the winding process, the inner layer coils are wound first and then the outer layer coils are wound. Compared with the inner layer coils, the outer layer coils are further from the center of the rotor core. This reduces the likelihood that both coils of a single winding unit would be damaged at the same time as the outer layer provides physical protection for the inner layer. The rotor windings can be wound by using a single flyer winding machine. That is, the inner layer coils and the outer layer coils are wound by one continuous wire.

Alternatively, the rotor windings can be wound by using a dual flyer winding machine having two flyers which wind the windings simultaneously. That is, the inner layer coils are wound by two separate wires at the same time, and then, the outer layer coils are wound by the two wires at the same time. In other words, some of the inner layer coils and some of the outer layer coils are wound by one continuous wire. The remaining inner layer coils and the remaining outer layer coils are wound by another continuous wire. Generally, the inner layer coils and the outer layer coils wound by the same one wire are disposed opposite about the rotor shaft. Winding the rotor windings with two flyers improves the manufacturing efficiency.

In this embodiment, the number of segments is equal to the number of winding units and also equal to the number of teeth. During the winding process of the inner layer coils, the wire is attached to each segment. During the winding process of the outer layer coils, the wire is attached to the each segment again.

Further more, two dummy slots 35 are formed in the circumferential surface of each tooth of the rotor core. The dummy slots 35 extend along a direction parallel to the direction of the winding tunnels, which in FIG. 3 is parallel to the axis of the motor. The dummy slots divide the circumference surface of each tooth into three parts. Vibration and noise is reduced by the dummy slots 35.

Figure 5:
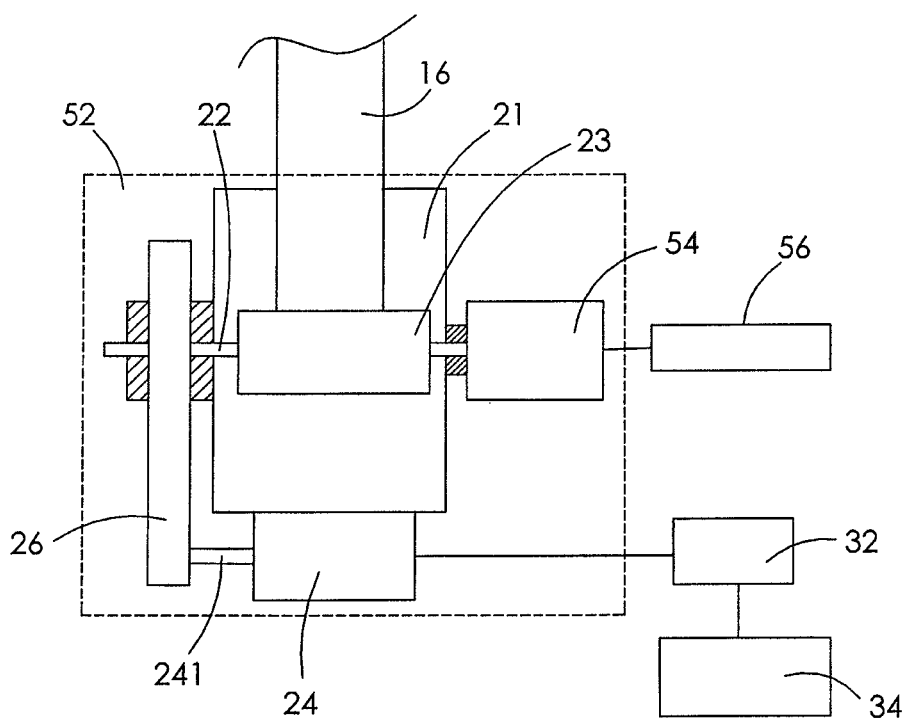
FIG. 5 illustrates a belt winder according to a second preferred embodiment of the present invention.
Figure 6:
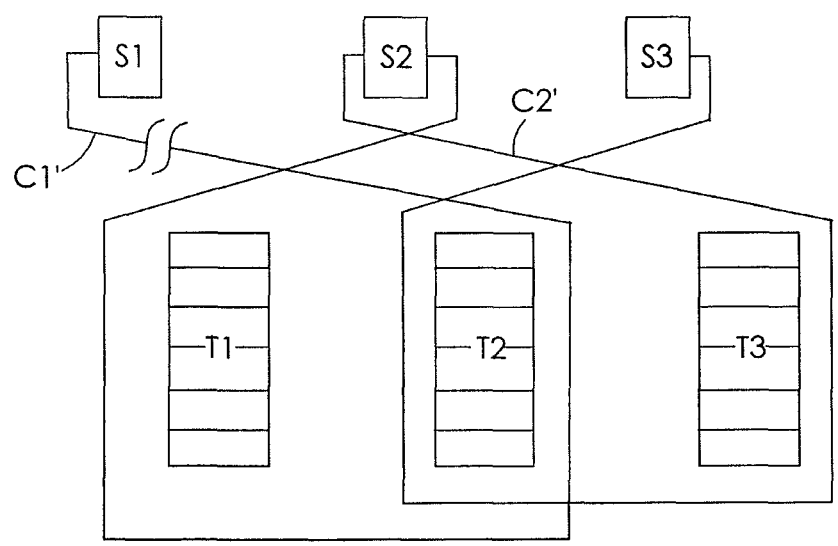
FIG. 6 illustrates rotor windings of a traditional motor used in a prior art belt winder.

FIG. 5 illustrates a belt winder 52 of a safety belt system according to another embodiment of the present invention. The belt winder 52 is similar to the belt winder 20. The difference is that the belt winder 52 further comprises a pretensioner 54 which is coupled to one end of the central shaft 22 of the belt reel 23 remote from the gear train 26. That is, two ends of the central shaft 22 are respectively coupled to the gear train 26 and the pretensioner 54.

In this embodiment, when a vehicle collision is imminent, which is preferably determined by the detection unit 34 by detecting if the distance between the vehicle and an obstacle in an area surrounding the vehicle is smaller than a given value, the detection unit 34 sends a signal to the controller 32 to operate the motor 24 to rotate the belt reel 23 via the gear train 26 to tighten the safety belt 16 such that the safety belt 16 properly restrains the occupant 14. When a vehicle collision happens, which is preferably determined by an electronic control unit (ECU) 56 of an airbag module of the vehicle, the explosive material in the pretensioner 54 is ignited to generate explosively expanding gas to drive a piston which further rotates the belt reel 23 to almost instantaneously tighten the safety belt 16 so as to prevent the occupant from jerking forward in the collision.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, each winding unit of the rotor windings may alternatively comprises more than two coils.

The invention claimed is:

1. A safety belt system comprising:
a safety belt for restraining an occupant in a seat;
a tongue plate arranged on the safety belt;
a buckle detachably engaged with the tongue plate;
a belt reel for tightening or loosing the safety belt;
an electric motor for driving the belt reel, the motor comprising:
a stator; and
a rotor rotatably mounted to the stator, the rotor comprising a motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments, in parallel;
a detection unit for detecting whether a predefined event is happening or is imminent; and
a controller for controlling the motor based on the detecting result of the detection unit,
wherein the rotor windings are arranged in two layers, an inner layer and an outer layer, each winding unit comprises two coils, one of the two coils being arranged in the inner layer, the other one of the two coils being arranged in the outer layer.

2. The safety belt system of claim 1, wherein the rotor windings are wound by one continuous wire.

3. The safety belt system of claim 1, wherein a part of the inner layer coils and a part of the outer layer coils are wound by one continuous wire, and the other part of the inner layer coils and the other part of the outer layer coils are wound by another continuous wire.

4. The safety belt system of claim 1, wherein at least one dummy slot is formed in a circumferential surface of each tooth of the rotor core.

5. The safety belt system of claim 1, wherein the rotor core comprises five teeth, and each tooth comprises two dummy slots formed in a circumferential surface of the tooth.

6. The safety belt system of claim 1, further comprising a pretensioner coupled to a central shaft of the belt reel.

7. The safety belt system of claim 1, wherein the stator has two magnetic poles, the rotor core has five teeth, and the commutator has five segments.

8. A safety belt system comprising:
a safety belt for restraining an occupant in a seat;
a tongue plate arranged on the safety belt;
a buckle detachably engaged with the tongue plate;
a belt reel for tightening or loosing the safety belt;
an electric motor for driving the belt reel, the motor comprising:
a stator; and
a rotor rotatably mounted to the stator, the rotor comprising an motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments, in parallel;
a detection unit for detecting whether a predefined event is happening or is imminent;
a controller for controlling the motor based on the detecting result of the detection unit; and
a transmission unit coupled between the motor shaft and a central shaft of the belt reel, the motor driving the belt reel via the transmission unit.

9. The safety belt system of claim 8, further comprising a pretensioner coupled to a first end of the central shaft of the belt reel, wherein the transmission unit is coupled between the motor shaft and a second end of the central shaft.

10. A belt winder for a safety belt system comprising:
a belt reel for tightening or loosing the safety belt;
an electric motor for driving the belt reel, the motor comprising a stator and a rotor rotatably mounted to the stator, the rotor comprising an motor shaft, a commutator fixed to the motor shaft, a rotor core fixed to the motor shaft and rotor windings wound about teeth of the rotor core and electrically connected to segments of the commutator, the rotor windings comprises a plurality of winding units, each winding unit comprising at least two coils, the coils of each winding unit being wound about the same teeth and electrically connected to a same pair of segments, in parallel; and a transmission unit coupled between the motor shaft and a central shaft of the belt reel, the motor driving the belt reel via the transmission unit.

11. The belt winder of claim 10, wherein the rotor windings are arranged in two layers, an inner layer and an outer layer, each winding unit comprises two coils, one of the two coils being arranged in the inner layer, the other one of the two coils being arranged in the outer layer.

12. The belt winder of claim 11, wherein the rotor windings are wound by one continuous wire.

13. The belt winder of claim 11, wherein a part of the inner layer coils and a part of the outer layer coils are wound by one continuous wire, and the other part of the inner layer coils and the other part of the outer layer coils are wound by another continuous wire.

14. The belt winder of claim 10, wherein at least one dummy slot is formed in a circumferential surface of each tooth of the rotor core.

15. The belt winder of claim 10, wherein the rotor core comprises five teeth, and each tooth comprises two dummy slots formed in a circumferential surface of the tooth.

16. The belt winder of claim 10, further comprising a pretensioner coupled to a central shaft of the belt reel.

17. The belt winder of claim 10, further comprising a pretensioner coupled to a first end of a central shaft of the belt reel, wherein the transmission unit is coupled between the motor shaft and a second end of the central shaft.

18. The belt winder of claim 10, wherein the stator has two magnetic poles, the rotor core has five teeth, and the commutator has five segments.

* * * * *